(12) United States Patent  
Trautmann et al.

(10) Patent No.: US 10,442,133 B2  
(45) Date of Patent: Oct. 15, 2019

(54) OPTICAL METHOD AND APPARATUS FOR FABRICATING A STRUCTURED OBJECT

(71) Applicant: HOCHSCHULE FUER ANGEWANDTE WISSENSCHAFTEN ASCHAFFENBURG, Aschaffenburg (DE)

(72) Inventors: Anika Trautmann, Sulzbach a Main (DE); Ralf Hellmann, Aschaffenburg (DE)

(73) Assignee: Hochschule Fuer Angewandte Wissenschaften Aschaffenburg, Aschaffenburg (DE)

( * ) Notice: Subject to any disclaimer, the term of this patent is extended or adjusted under 35 U.S.C. 154(b) by 0 days.

(21) Appl. No.: 16/104,603

(22) Filed: Aug. 17, 2018

(65) Prior Publication Data

US 2019/0047224 A1 Feb. 14, 2019

Related U.S. Application Data

(63) Continuation of application No. PCT/EP2017/052705, filed on Feb. 8, 2017.

(30) Foreign Application Priority Data

Feb. 17, 2016 (EP) .................... 16156116

(51) Int. Cl.
  *B29C 64/273* (2017.01)
  *B33Y 30/00* (2015.01)
  (Continued)

(52) U.S. Cl.
  CPC .......... *B29C 64/273* (2017.08); *B29C 64/135* (2017.08); *B29C 64/277* (2017.08);
  (Continued)

(58) Field of Classification Search
  CPC ... B29C 64/273; B29C 64/277; B29C 64/135; B33Y 10/00; B33Y 30/00; G02B 5/003
  See application file for complete search history.

(56) References Cited

U.S. PATENT DOCUMENTS 5,182,056 A * 1/1993 Spence ................. G01J 1/4257  
  264/401  
5,460,758 A * 10/1995 Langer ................. G03F 7/0037  
  264/401

(Continued)

FOREIGN PATENT DOCUMENTS

| DE | 101 11 422 A1 | 9/2002 |
| EP | 1 025 981 A2 | 8/2000 |
| WO | WO 2012/074986 A1 | 6/2012 |

OTHER PUBLICATIONS

Gittard et al., "Fabrication of microscale medical devices by two-photon polymerization with multiple foci via a spatial light modulator," Biomedical Optical Express 3167, vol. 2, No. 11, pp. 1-12 (Oct. 26, 2011).

*Primary Examiner* — Brian W Wathen  
*Assistant Examiner* — Brian T McMenemy  
(74) *Attorney, Agent, or Firm* — Muncy, Geissler, Olds & Lowe, P.C.

(57) ABSTRACT

A method and an apparatus for fabricating a structured object wherein a photo-curing material, which is cured by being irradiated with light, within successive layers is irradiated with light providing energy, which is transformed by absorption to internal energy of the photo-curing material for curing, thereby forming the object. Within each individual layer of the successive layers coarse structures of the object and fine structures of the object are identified. A first light beam is directed, which provides a single photon energy that matches the energy gap of the photo-curing material for absorption, to first focus positions within the (Continued)

photo-curing material. The first focus positions being associated with the coarse structures of the object within a first individual layer of the successive layers, to cure the photo-curing material at the first focus positions thereby forming the coarse structures of the object within the first individual layer.

15 Claims, 3 Drawing Sheets

(51) Int. Cl.
*B29C 64/135* (2017.01)
*B33Y 10/00* (2015.01)
*B29C 64/277* (2017.01)
*G02B 5/00* (2006.01)
*G02B 27/10* (2006.01)
*G02B 27/40* (2006.01)

(52) U.S. Cl.
CPC ............... *B33Y 10/00* (2014.12); *B33Y 30/00* (2014.12); *G02B 5/003* (2013.01); *G02B 27/106* (2013.01); *G02B 27/40* (2013.01)

(56) References Cited

U.S. PATENT DOCUMENTS

| | | | |
|---|---|---|---|
| 5,536,467 A | | 7/1996 | Reichle et al. |
| 6,122,564 A | * | 9/2000 | Koch .................... B22F 3/1055 700/123 |
| 6,406,658 B1 | | 6/2002 | Manners et al. |
| 6,624,915 B1 | | 9/2003 | Kirkpatrick et al. |
| 8,945,456 B2 | | 2/2015 | Zenere |
| 2003/0013047 A1 | | 1/2003 | Tani |
| 2013/0056910 A1 | | 3/2013 | Houbertz-Krauss et al. |
| 2016/0082666 A1 | * | 3/2016 | de Pena ............ G05B 19/4099 700/98 |

* cited by examiner

OPTICAL METHOD AND APPARATUS FOR FABRICATING A STRUCTURED OBJECT

This nonprovisional application is a continuation of International Application No. PCT/EP2017/052705, which was filed on Feb. 8, 2017, and which claims priority to European Patent Application No. 16 156 116.2, which was filed in Europe on Feb. 17, 2016, and which are both herein incorporated by reference.

BACKGROUND OF THE INVENTION

Field of the Invention

The invention relates to an optical method and apparatus for fabricating a structured object, where a photo-curing material, which is cured by being irradiated with light, within successive layers is irradiated with light that provides energy, which is transformed by absorption to internal energy of the photo-curing material for curing, to thereby form the object. More specifically, the invention relates to a stereolithographic method and apparatus to fabricate a structured object, wherein a multiple photon absorption phenomenon is caused by light to cure the photo-curing material.

Description of the Background Art

Stereolithographic methods and also stereolithographic apparatuses for fabricating a structured object by irradiating a photo-curing material with light are well known in the art and, for example, described in U.S. Pat. No. 8,945,456 B2, WO 2012/074986 A1 and EP 1 025 981 A2, which corresponds to U.S. Pat. No. 6,406,658.

It is also known to use a multiple photon absorption phenomenon for curing the photo-curing material by irradiating with light during fabrication of the object (see, for example, DE 10 111 422 A1 and U.S. Pat. No. 6,624,915 B1). Today, stereolithographic methods are used to fabricate customized three dimensional objects and components in micro systems technology, in medical technology or in rapid prototyping. A photo-curing material is irradiated with light providing energy, which is transformed by absorption to internal energy that causes curing of the photo-curing material, typically by a polymerization process.

Today, with stereolithographic methods microscopic objects having a volume of 1.000 $cm^3$ and a maximum spatial resolution between 10 µm and 100 µm can be fabricated within a few hours. Multiple photon absorption methods are used to fabricate smaller objects having a volume of typically maximum 1 $cm^3$ and a higher spatial resolution of minimum 100 nm. However, a fabrication time of a few days is needed to produce such an object. The large fabrication time needed for the production of objects having a high spatial resolution limits the field of application for multiple photon absorption methods.

To solve this problem, it is known from US 2003/0013047 A1 to use a conventional stereolithographic process (linear absorption) to fabricate a pre-shape of the object by applying a first light beam to the photo-curing material and to fabricate the predetermined shape of the object from the pre-shape by applying a second light beam to the photo-curing material, which causes a multiple photon absorption phenomenon (non-linear absorption) to cure the photo-curing material. Providing that combination of a conventional stereolithographic process and a multiple photon absorption process allows realizing high speed processing by using a conventional optical fabrication process and optical fabrication of fine structures of the object by using multiple photon absorption.

However, the method as described in US 2003/0013047 A1 only allows use of the multiple photon absorption process after the pre-shape of the object has been finalized. This has the disadvantage that not all parts of the object can be finely structured by the subsequent multiple photon absorption process. The already finalized pre-shape may prevent focusing optics from being set at a distance needed for the required focus positions at the object's surface.

SUMMARY OF THE INVENTION

It is therefore an object of the present invention to provide a fabricating method and apparatus, by which a structured object can be optically fabricated with high accuracy and within a short period of time.

In order to achieve the aforementioned object, a first aspect of the present invention concerns a method of fabricating a structured object wherein a photo-curing material, which is cured by being irradiated with light, within successive layers is irradiated with light providing energy, which is transformed by absorption to internal energy of the photo-curing material for curing, thereby forming the object. The method according to the invention comprises the steps: identifying within each individual layer of the successive layers coarse structures of the object and fine structures of the object, directing a first light beam, which provides a single photon energy that matches the energy gap of the photo-curing material for absorption, to first focus positions within the photo-curing material. The first focus positions being associated with the coarse structures of the object within a first individual layer of the successive layers, to cure the photo-curing material at the first focus positions thereby forming the coarse structures of the object within the first individual layer, directing at the same time or subsequently a second light beam, which provides a single photon energy less than the energy gap of the photo-curing material for absorption, to second focus positions within the photo-curing material, the second focus positions being associated with the fine structures of the object within the first individual layer to cure the photo-curing material at the second focus positions by multiple photon absorption, thereby forming the fine structures of the object within the first individual layer, and repeating the steps of directing the first light beam to first focus positions and the second light beam to second focus positions within a next and all of the remaining individual layers of the successive layers.

In order to achieve the aforementioned object, a second aspect of the present invention concerns an apparatus, by which a photo-curing material, which is cured by being irradiated with light, within successive layers is irradiated with light providing energy, which is transformed by absorption to internal energy of the photo-curing material for curing, thereby forming the object. The apparatus comprises: a light source section comprising a light generator for generating a first light beam, which provides a single photon energy that matches the energy gap of the photo-curing material for absorption, and for generating a second light beam, which provides a single photon energy less than the energy gap of the photo-curing material for absorption to cause a multiple photon absorption phenomenon in the photo-curing material, a container suitable for containing the photo-curing material, a first light director for directing the first light beam to first focus positions within the photo-curing material, a second light director for directing the second light beam to second focus positions within the photo-curing material, and a controller being adapted to identify within each individual layer of the successive layers coarse structures of the object and fine structures of the object, to control the first light director for directing the first light beam to first focus positions associated with the coarse structures of the object within a first individual layer of the successive layers to cure the photo-curing material at the first focus positions, thereby forming the coarse structures of the object within the first individual layer, to control the second light director for directing the second light beam to second focus positions associated with the fine structures of the object within the first individual layer to cure the photo-curing material at the second focus positions by multiple photon absorption, thereby forming the fine structures of the object within the first individual layer, and to repeat the steps of directing the first light beam to first focus positions and the second light beam to second focus positions within a next and all of the remaining individual layers of the successive layers.

In a first step, the invention realizes that the aforementioned disadvantage of fabricating a pre-shape of the object is overcome when the object is fabricated in layers, wherein within each individual layer coarse structures of the object are fabricated by using the conventional stereolithographic process (linear absorption) and fine structures of the object are fabricated by using the multiple photon absorption process (non-linear absorption). The thickness of a layer typically is much less than the size of the object to be fabricated and is given, for example, by the spatial resolution of the conventional stereolithographic process. Typically, the thickness of a single individual layer might be given between 10 µm and 100 µm. Even if within such an individual layer the fine structures of the object are fabricated after the fabrication of the coarse structures has been finalized, the focusing optics are not prevented from being set at a distance required for focusing the second light beam to focus positions associated with the fine structures. Dependent on the focus length a typical work distance between the focusing optics and the object to be fabricated is between 0.1 mm and 5 mm.

In a second step, the invention further realizes that an optical fabrication method, by which the object is fabricated in layers by forming within each of these layers the coarse structures and the fine structures, will also allow a synchronized fabrication of the coarse structures and the fine structures within each layer. Such synchronization will further speed up the fabrication process and hence, will decrease the total fabrication time.

In a first step of an optical fabrication method, a virtual model of the object, i.e. a data set that represents the object, is created or provided. The structural data of the virtual model are then used to define focus positions needed for optically fabricating the object by irradiating the photo-curing material with light. According to one aspect of the invention the virtual model is subdivided into multiple layers that are used for the optical fabrication of the object in layers. Advantageously, the thickness of an individual layer is chosen to at least equivalent the maximum size of the structures of the object to be formed in this layer, which naturally is given by the dimensions of the coarse structures of the object. A typical thickness of an individual layer is in the range of 10 µm. Taking into consideration that the spatial resolution for curing using a multiple photon absorption process is in the range of 100 nm, the thickness of a single layer of the object is typically 100 times larger than the size of the structures formed by multiple photon absorption. On the other hand, each focus position within a layer having a thickness of a few 10 µm can be reached for multiple photon absorption even in case of a short working distance between the focusing optics and the object to be fabricated.

The data of the virtual object are then further analyzed for each of the successive layers to identify within each layer coarse structures of the object and fine structures of the object. Advantageously, the coarse structures comprise structural elements having a size between 10 µm and 100 µm, and the fine structures comprise structural elements having a size between 100 nm and 500 nm.

Then the object is fabricated in layers, wherein within each of the successive layers a first light beam, which provides a photon energy that matches the energy gap of the photo-curing material for absorption (i.e. the conventional stereolithographic process) is directed to first focus positions within the photo-curing material, the first focus position being associated with the coarse structures of the object within the respective layer, and at the same time or subsequently a second light beam, which provides a single photon energy less than the energy gap of the photo-curing material for absorption (i.e. the multiple photon absorption process), is directed to second focus positions within the photo-curing material, the second focus positions being associated with the fine structures of the object within the respective layer. The fabrication of the object is completed after within all of the successive layers the coarse structures and the fine structures have been formed by curing of the photo-curing material.

The determination of coarse structures and fine structures within each of the successive layers can be optimized such that only those structural elements of the object being identified as fine structures, which cannot be fabricated by a conventional stereolithographic process with the required spatial resolution. This minimizes the total fabrication time of the object because with that choice of the fine structures the lowest possible fraction of structures of the object is produced by using the multiple photon absorption process.

The multiple photon absorption process is a third-order process, several orders of magnitude weaker than linear absorption, which is used for the conventional stereolithographic process. Particularly, the two photon absorption differs from linear absorption in that the atomic transition rate depends on the square of the light intensity. On the other hand, it becomes clear that with a lithographic process using multiple photon absorption a much higher spatial resolution can be reached as compared to a lithographic process using linear absorption. For a given light spot the half-width of the squared intensity distribution is significant smaller than the half-width of the intensity distribution.

At least one of the first light beam and the second light beam can be split into a plurality of light beams directed to focus positions within the photo-curing material thereby forming multiple structures of the object and/or multiple objects in parallel. Particularly, multiple copies of the same object may be fabricated in parallel. With multiple beams it is also possible to generate different structures of the object in parallel. Both will further decrease the fabrication time needed for producing the single object.

For example, a beam splitting element can be used to split the first and/or the second light beam. Typically, for splitting a light beam into two beams a mirror is used which passes a first fraction of the light beam and reflects another fraction of the light beam. An acousto-optic modulator can be used as a beam splitting element, which divides a passing light beam into a zero-order light beam and into higher-order light beams by refraction.

The intensity of at least one of the first light beam and the second light beam can be controlled during fabrication of the object. The intensity of the light beam affects the size of the cured volume ("voxel") within the focused light spot. The intensity of at least one of the light beams can be controlled to reach the required spatial resolution of the object to be fabricated. Practically, at least one of an acousto-optic modulator, a Kerr Cell and a Pockels Cell are used to control the intensity of the first and/or the second light beam.

At least one of the phase, the polarization and the intensity of at least one of the first light beam and the second light beam can be spatially modulated during fabrication of the object. Preferably, a spatial light modulator is controlled to modify the spatial intensity distribution of the first and/or the second light beam or to change the focus position of the first and/or second light beam. Advantageously, the spatial light modulator is controlled to generate multiple light beams. Particularly, the spatial light modulator is used to change the spatial intensity distribution of the first and/or the second light beam from a Gauss distribution to a top-hat distribution or vice versa. A top-hat intensity distribution allows for a better overlap between the cured voxels of the photo-curing material caused by light directed to adjacent focus positions. Accordingly, line structures and flat regions of the object can be fabricated with higher accuracy.

The first light beam and the second light beam can be focused with the aid of a common light focusing optics. A common light focusing optics for both of the light beams eliminates spatial distortions between the first focus positions and the second focus positions caused by differences in two focusing optics used for focusing the first light beam and the second light beam respectively.

Practically, the focusing optics and the container are movable relatively to each other. Advantageously, the container is movable in an x-y-plane, whereas the focusing optics is movable along the z-direction. The focusing optics can be movable in all three dimensions, i.e. along the x-, y- and z-direction. On the other hand, it is also possible to direct the light beams to different focus positions within the photo-curing material by spatially modulating the light of the respective light beam with the aid of a spatial light modulator, as mentioned above. In this case, there is no need for any mechanics for changing the relative position between the focusing optics and the photo-curing material.

The frequency of the first light beam causing linear absorption in the photo-curing material is chosen higher than the frequency of the second light beam causing multiple photon absorption in the photo-curing material. Causing a two photon absorption phenomenon in the photo-curing material can be implemented with a frequency of the second light beam, which is half the frequency of the first light beam. Accordingly, a second harmonic generator can be used to generate the first light beam by the second light beam with a second harmonic generation process. Accordingly, only one light source for generating the second light beam may be needed for the apparatus.

The first light beam can be generated by a diode laser, which particularly emits ultra violet light. Light emitted by a diode laser provides enough energy to cause a curing process within the photo-curing material by linear absorption within a focus spot. Preferably, the wavelength of the first light beam is chosen between 360 nm and 440 nm.

The second light beam can be generated by a pulsed laser, which particularly emits infrared laser pulses. A laser pulse emitted by a pulsed laser provides enough energy to cause a curing process within the photo-curing material by a multiple photon absorption process within a focus spot. Preferably, a pulsed laser emitting fs-pulses is used. Advantageously, a fs-laser is used, which generates laser pulses at a wavelength between 720 nm and 880 nm.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
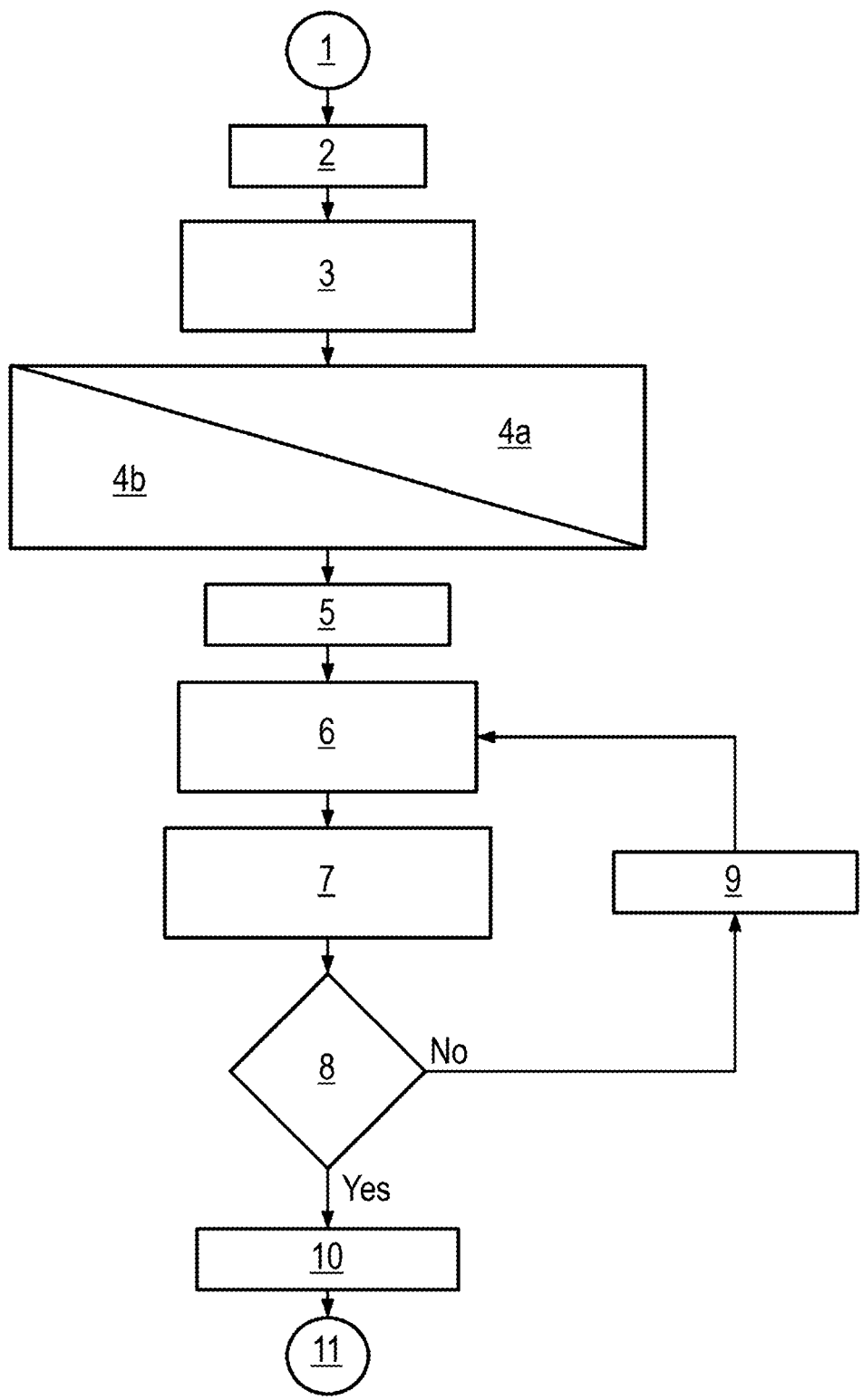
FIG. 1 shows a flow chart of the optical fabricating method.

A processing routine for fabricating a structured object by irradiating a photo-curing material with light is shown in FIG. 1. After the start in step 1, in step 2 a virtual 3D model of the object to be fabricated is created or provided. This, for example, may be done with the aid of a known CAD program. The object to be fabricated is then represented by the data of the virtual 3D model, particularly in the digital domain.

In the next step 3, the 3D model of the object is subdivided into multiple layers. The height or thickness of an individual layer is chosen to match the maximum size of the structures of the object to be formed within the layer. The thickness of an individual layer is given, for example, by approximately 10 μm.

In step 4, for each individual layer of the multiple successive layers coarse structures of the object (4a) and fine structures of the object (4b) are identified. The coarse structures within each individual layer are identified to be fabricated by a conventional stereolithographic process using linear absorption of light to cure the photo-curing material. The fine structures of the object within each individual layer are identified to be fabricated by a multiple photon absorption process using non-linear absorption for curing the photo-curing material. Particularly, the fine structures are those structures, which need to be fabricated with a spatial resolution that is not reached by the conventional stereolithographic process. Preferably, the coarse structures comprise structural elements with a size between 10 μm and 100 μm and the fine structures comprise structural elements with a size between 100 nm and 500 nm.

In step 5, for a first (k=1) of n individual layers the optical fabrication of the respective coarse structures and fine structures of the object is started.

In step 6, a first light beam, which provides a single photon energy that matches the energy gap of the photo-curing material for absorption, is directed to first focus positions within the photo-curing material, the first focus positions being associated with the coarse structures of the object within the first (k=1) layer of the successive layers. At each of the addressed first focus positions the photo-curing material gets cured and hence, the coarse structures of the object within the first (k=1) layer are formed by a conventional stereolithographic process on behalf of linear absorption.

In step 7, at the same time or subsequently to step 6 a second light beam, which provides a single photon energy less than the energy gap of the photo-curing material for absorption, is directed to second focus positions within the photo-curing material, the second focus positions being associated with the fine structures of the object within the first (k=1) layer. The photo-curing material gets cured at the second focus positions and hence, the fine structures of the object within the first (k=1) layer are formed by a multiple photon absorption process on behalf of non-linear absorption.

After having completed the formation of the coarse structures of the object and of the fine structures of the object within the first (k=1) layer, in step 8 it is verified whether k=n. In case of "No", in step 9 the value of the parameter k is set to k+1 and steps 6, 7 and 8 are repeated until within all n layers of the successive layers the coarse structures and the fine structures have been formed and the fabrication of the object is finished.

In an optional step 10, the fabricated object is finally cured, cleaned and/or machine finished. In step 11, the processing routine is ended.

Figure 2:
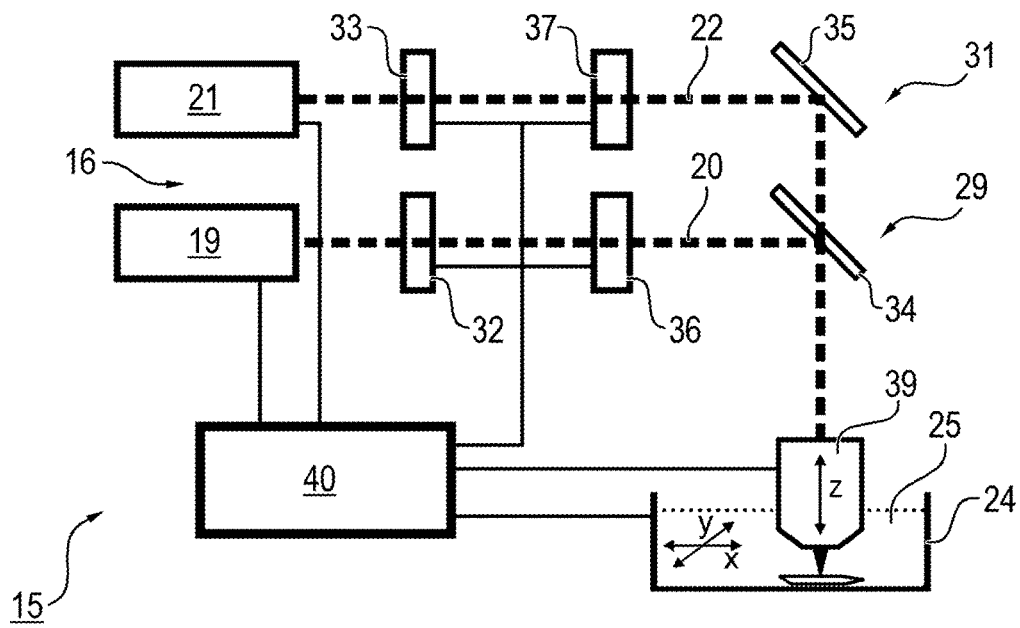
FIG. 2-5 show examples of an optical fabricating apparatus according to the invention.

FIG. 2 schematically shows an apparatus 15 for optically fabricating a structured object. The apparatus 15 comprises a light source section 16 comprising a first light generator 19 for generating a first light beam 20 and second light generator 21 for generating a second light beam 22. The apparatus 15 further comprises a container 24, in which a liquid photo-curing material 25 is retained. The first light beam 20 provides a photon energy that matches the energy gap of the photo-curing material for absorption, thereby causing a curing process, particularly a polymerization, in the photo-curing material 25 by linear absorption of light. The second light beam 22 provides a photon energy less than the energy gap of the photo-curing material 25 for absorption, causing a curing process in the photo-curing material by non-linear multiple photon absorption. For instance, the photon energy of the second light beam 22 is half of the energy gap for absorption to cause two-photon absorption for curing the photo-curing material 25.

Additionally, the apparatus 15 comprises a first light director 29 for directing the first light beam 20 to first focus positions within the photo-curing material 25 and a second light director 31 for directing the second light beam 22 to second focus positions within the photo-curing material 25. The first light director 29 for directing the first light beam 20 to first focus positions comprises a first intensity modulator 32, a first mirror 34 and a first spatial light modulator 36. The second light director 31 for directing the second light beam 22 to second focus positions comprises a second intensity modulator 33, a second spatial light modulator 37 and a second mirror 35. The first mirror 34 is a dichroic mirror, which reflects the first light beam 20 and passes the second light beam 22.

Preferably, an acousto-optic modulator is used as the first intensity modulator 32 and another acousto-optic modulator is used as the second intensity modulator 33. The acousto-optic modulator is used to control the intensity of the passing light beams 20, 22, which particularly represents the first-order beam of the acousto-optic modulator. For each of the first spatial light modulator 36 and the second spatial light modulator 37 a modulator element is used, which spatially modulates the intensity and/or the phase of the passing first and second light beam 20, 22, respectively. This allows modulating the spatial intensity distribution of the first light beam 20 and of the second light beam 22. It further allows moving the focus positions within the photo-curing material 25 without the need of a mechanical movement of components.

After reflection at the first mirror 34 and at the second mirror 35, respectively, the first light beam 20 and the second light beam 22 are subsequently focused by a common focusing optics 39 to multiple focus positions within the photo-curing material 25. In the example shown in FIG. 2 the focusing optics 39 is movable along the z-direction. The container 24 is movable along the x-y-plane.

A controller 40 is further comprised to control the first light generator 19 for generating a first light beam 20, the second light generator 21 for generating a second light beam 22, the first and second intensity modulators 32, 33, the first and second spatial light modulators 36, 37 and the movement of the common focusing optics 39 and of the container 24. Particularly, the controller 40 is adapted to control the apparatus 15 according to the fabrication process shown in FIG. 1.

Figure 3:
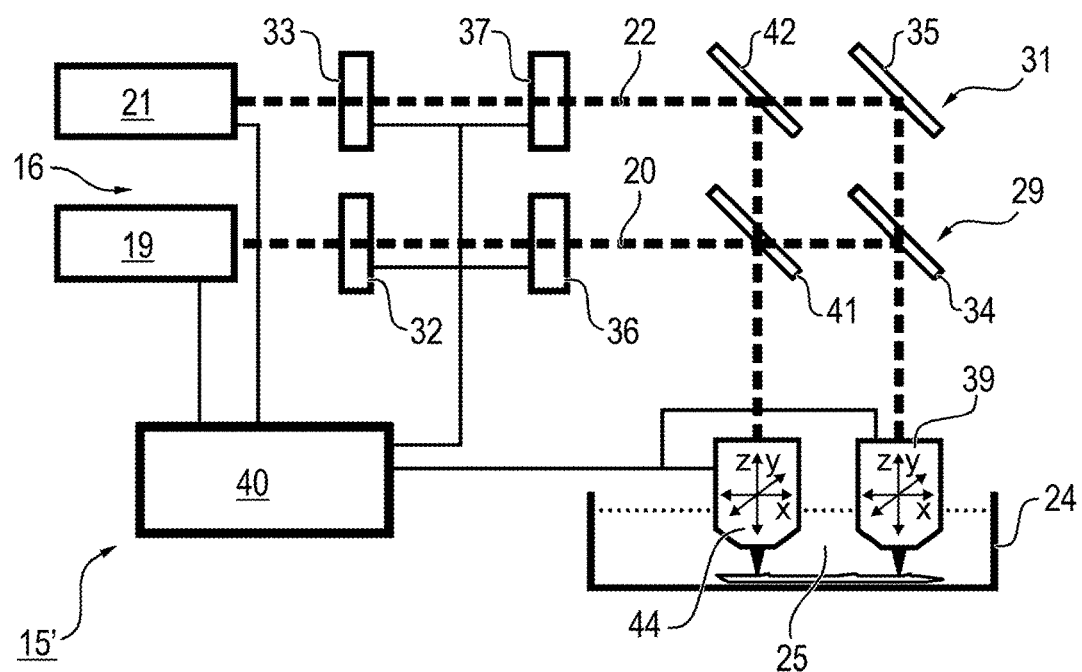

FIG. 3 depicts an optical fabricating apparatus 15'. Compared to the example shown in FIG. 2, a first beam splitter 41 is placed in the path of the first light beam 20 and a second beam splitter 42 is placed in the path of the second light beam 22. At each of the first beam splitter 41 and the second beam splitter 42, one half of the first light beam 20 and one half of the second light beam 22, respectively, are reflected and the other half of the first light beam 20 and of the second light beam 22, respectively, is passed through. Additionally, the first beam splitter 41 is a dichroic optical element, which passes light of the second light beam 22.

With the apparatus 15' shown in FIG. 3 along two distinct paths a first light beam 20 and a second light beam 22 are directed in parallel to the photo-curing material 25 contained in the container 24. For each of the distinct paths a separate common focusing optics 39, 44 is used to focus the first light beam 20 and the second light beam 22 in parallel to different first focus positions and to different second focus positions. This allows fabricating two structured objects or different structures of the same object in parallel. In the example of the apparatus 15' shown in FIG. 3 the common focusing optics 39, 44 are both movable along the x-, y- and z-direction.

Figure 4:
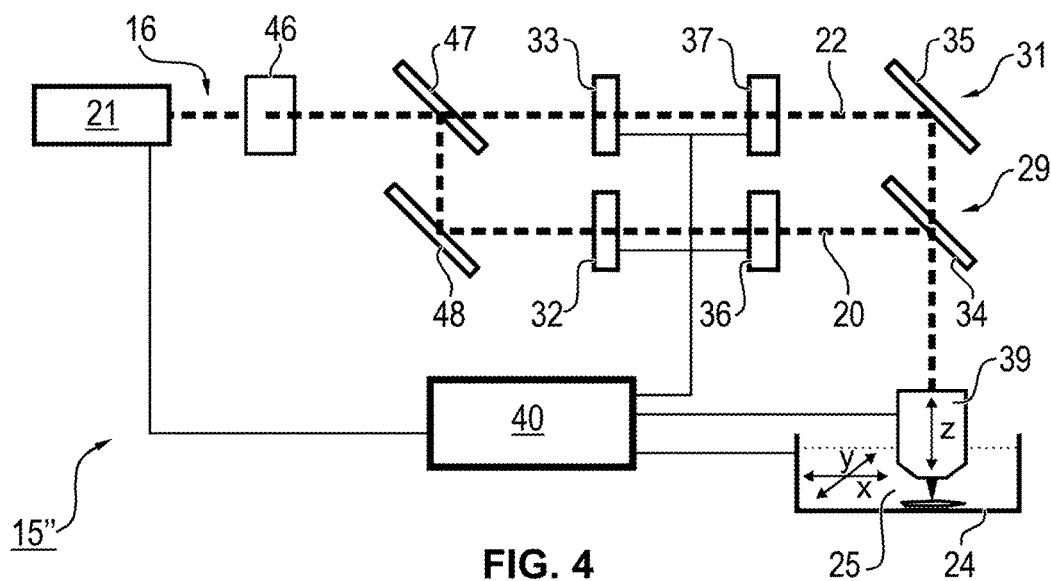

A third example of the optical fabricating apparatus 15" is shown in FIG. 4. The light source section 16 of the apparatus 15" shown in FIG. 4 comprises the second light generator 21 for generating a second light beam 22. In a second harmonic generator 46 the first light beam 20 is generated by the second light beam 22 by a second harmonic generation. In a beam splitter 47 the first light beam 20 is separated from the second light beam 22. A mirror 48 is placed into the path of the first light beam 20 for reflection. The other components of the apparatus 15" shown in FIG. 4 are similar to those of the apparatus 15 shown in FIG. 2.

Figure 5:
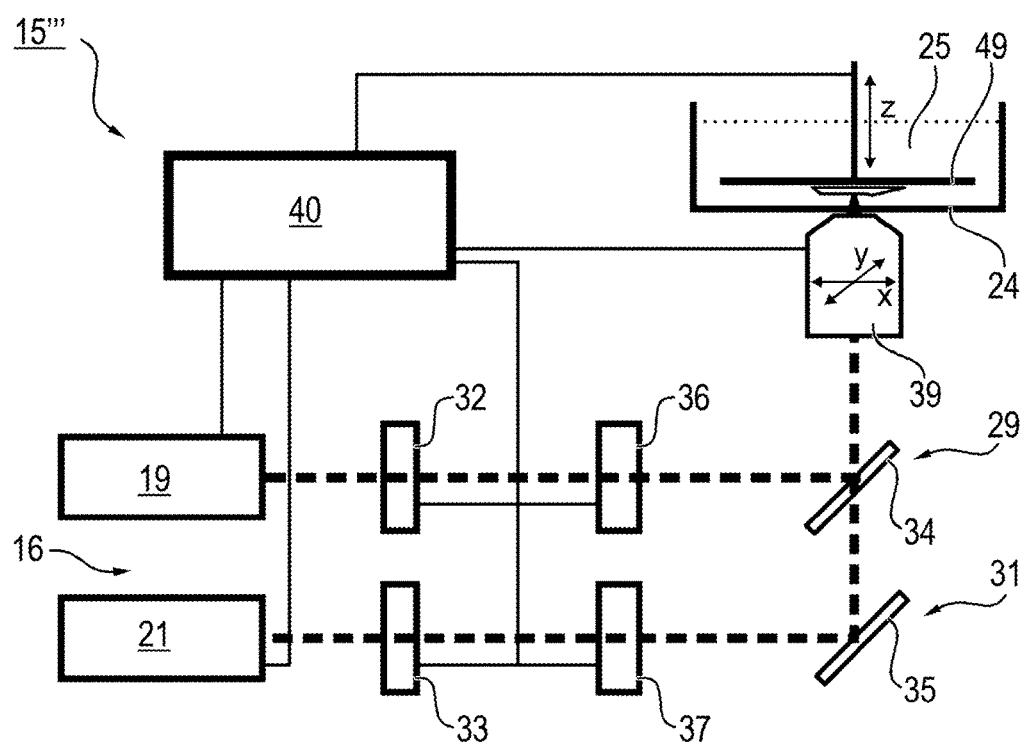

A fourth example of an optical fabricating apparatus 15''' is depicted in FIG. 5. In the apparatus 15''' shown in FIG. 5, the container 24 is placed above the common focusing optics 39. The object to be fabricated is formed in layers on the bottom side of a movable platform 49. The platform 49 is movable along the z-direction. The common focusing optics 39 is movable along the x-y-plane. The other components of the apparatus 15''' according to FIG. 5 are identical to those of the apparatus 15 shown in FIG. 2.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method of fabricating a structured object wherein a photo-curing material, which is cured by being irradiated with light, within successive layers is irradiated with light providing energy, which is transformed by absorption to internal energy of the photo-curing material for curing, thereby forming the object, the method comprising:
identifying within each individual layer of the successive layers coarse structures of the object and fine structures of the object;
directing a first light beam, which provides a single photon energy that matches the energy gap of the photo-curing material for absorption, to first focus positions within the photo-curing material, the first focus positions being associated with the coarse structures of the object within a first individual layer of the successive layers, to cure the photo-curing material at the first focus positions thereby forming the coarse structures of the object within the first individual layer;
directing a second light beam, which provides a single photon energy less than the energy gap of the photo-curing material for absorption, to second focus positions within the photo-curing material, the second focus positions being associated with the fine structures of the object within the first individual layer to cure the photo-curing material at the second focus positions by multiple photon absorption, thereby forming the fine structures of the object within the first individual layer, and
repeating the steps of directing the first light beam to the first focus positions and the second light beam to the second focus positions within a next and at least one remaining individual layer of the successive layers.

2. The method according to claim 1, wherein at least one of the first light beam and the second light beam is split into a plurality of light beams directed to focus positions within the photo-curing material, thereby forming multiple structures of the object and/or multiple objects in parallel.

3. The method according to claim 1, wherein an intensity of the first light beam or the second light beam is controlled during fabrication of the object, and/or wherein the phase, the polarization or the intensity of the first light beam or the second light beam is spatially modulated during fabrication of the object.

4. The method according to claim 1, wherein the first light beam and the second light beam are focused via light focusing optics.

5. The method according to claim 1, wherein the first light beam is generated by the second light beam with a second harmonic generation process.

6. The method according to claim 1, wherein the first light beam is generated by a diode laser, the diode laser emitting ultraviolet light.

7. The method according to claim 1, wherein the second light beam is generated by a pulsed laser, the pulsed laser emitting infrared laser pulses.

8. The method according to claim 1, wherein the individual layers of the successive layers each have a thickness between 10 μm and 100 μm, and/or wherein the coarse structures comprise structural elements having a size between 10 μm and 100 μm, and/or wherein the fine structures comprise structural elements having a size between 100 nm and 500 nm.

9. An apparatus via which a photo-curing material, which is cured by being irradiated with light, within successive layers is irradiated with light providing energy, which is transformed by absorption to internal energy of the photo-curing material for curing, thereby forming the object, the apparatus comprising:
a light source section comprising a light generator that generates a first light beam, which provides a single photon energy that matches an energy gap of the photo-curing material for absorption, and that generates a second light beam, which provides a single photon energy less than the energy gap of the photo-curing material for absorption to cause a multi photon absorption phenomenon in the photo-curing material;
a container for containing the photo-curing material;
a first light director adapted to direct the first light beam to first focus positions within the photo-curing material;
a second light director adapted to direct the second light beam to second focus positions within the photo-curing material; and
a controller adapted:
to identify within each individual layer of the successive layers coarse structures of the object and fine structures of the object,
to control the first light director for directing the first light beam to first focus positions associated with the coarse structures of the object within a first individual layer of the successive layers to cure the photo-curing material at the first focus positions, thereby forming the coarse structures of the object within the first individual layer,
to control the second light director for directing the second light beam to second focus positions associated with the fine structures of the object within the first individual layer to cure the photo-curing material at the second focus positions by multiple photon absorption, thereby forming the fine structures of the object within the first individual layer, and
to repeat the steps of directing the first light beam to first focus positions and the second light beam to second focus positions within a next and at least one remaining individual layer of the successive layers.

10. The apparatus according to claim 9, wherein the first light director for directing the first light beam to first focus positions or the second light director for directing the second light beam to second focus positions comprises at least one beam splitting element to split the first and/or the second light beam into a plurality of light beams, and wherein the controller is further adapted to control the first light director for directing the first light beam and/or the second light director for directing the second light beam to form multiple structures of the object and/or multiple objects in parallel.

11. The apparatus according to claim 9, wherein the first light director for directing the first light beam to first focus positions or the second light director for directing the second light beam to second focus positions comprises at least one controllable intensity modulator, and wherein the controller is further adapted to control the intensity of the first light beam and/or of the second light beam during fabrication of the object via the at least one intensity modulator.

12. The apparatus according to claim 9, wherein the first light director for directing the first light beam to first focus positions or the second light director for directing the second light beam to second focus positions comprises a controllable spatial light modulator, and wherein the controller is further adapted to control the phase, the polarization or the intensity of the first light beam and/or of the second light beam via at least one spatial modulator.

13. The apparatus according to claim 9, wherein the first light director for directing the first light beam to first focus positions or the second light director for directing the second light beam to second focus positions comprise light focusing optics.

14. The apparatus according to claim 9, wherein the light source section comprises a diode laser adapted to generate the first light beam, particularly of ultraviolet light, or wherein the light source section comprises a pulsed laser adapted to generate pulses of the second light beam, particularly of infrared light.

15. The apparatus according to claim 9, wherein the light source section comprises a second harmonic generator adapted to generate the first light beam by the second light beam by a second harmonic generation process.

* * * * *